US011243650B2

(12) United States Patent
Zong et al.

(10) Patent No.: US 11,243,650 B2
(45) Date of Patent: Feb. 8, 2022

(54) ACCESSING WINDOW OF REMOTE DESKTOP APPLICATION

(71) Applicant: International Business Machines Corporation, Armonk, NY (US)

(72) Inventors: Dong Jun Zong, Beijing (CN); Da Li Liu, Beijing (CN); Jing Xing, Beijing (CN); Xue Fei Duan, Beijing (CN); Yue Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 15/914,898

(22) Filed: Mar. 7, 2018

(65) Prior Publication Data

US 2019/0278430 A1    Sep. 12, 2019

(51) Int. Cl.
*G06F 17/00* (2019.01)
*G06F 3/0481* (2013.01)
*G06F 9/451* (2018.01)

(52) U.S. Cl.
CPC ............ *G06F 3/0481* (2013.01); *G06F 9/452* (2018.02)

(58) Field of Classification Search
CPC ...................................................... G06F 9/452
See application file for complete search history.

(56) References Cited

U.S. PATENT DOCUMENTS

| 6,128,661 | A | 10/2000 | Flanagin et al. | |
|---|---|---|---|---|
| 7,870,496 | B1 | 1/2011 | Sherwani | |
| 9,201,563 | B2 | 12/2015 | Jia et al. | |
| 9,430,134 | B1 | 8/2016 | Hsu | |
| 10,298,642 | B2* | 5/2019 | Teng | H04L 65/4084 |
| 10,430,036 | B2* | 10/2019 | Barton | G06F 3/04883 |
| 2004/0148571 | A1* | 7/2004 | Lue | G06F 16/9577 715/239 |
| 2005/0240873 | A1* | 10/2005 | Czerwinski | G06F 3/0481 715/740 |
| 2009/0125799 | A1* | 5/2009 | Kirby | H04N 1/00464 715/234 |
| 2011/0138295 | A1* | 6/2011 | Momchilov | G06F 3/0484 715/740 |
| 2012/0192078 | A1* | 7/2012 | Bai | G06F 3/04883 715/740 |

(Continued)

OTHER PUBLICATIONS

Raskar et al., "Virtual Network Computing—A Technique to Control Android Phones Remotely," International Journal of Engineering and Computer Science, vol. 3, Issue 2, Feb. 2014, pp. 3991-3995.

(Continued)

*Primary Examiner* — Mustafa A Amin
(74) *Attorney, Agent, or Firm* — Kelsey M. Skodje (57) ABSTRACT

This disclosure relates to a method, system, and computer program product for accessing remote desktop applications. In one implementation, a computer-implement method is provided. According to the method, a split view of a window of an application running on a host device is determined at the host device, wherein the split view comprises a plurality of sub-windows, and each of the sub-windows provides a view of a portion of the window. Information about the sub-windows is sent to a client device in communication with the host device. Frame buffer data of at least one of the sub-windows is transmitted to the client device in response to receiving a selection of the at least one sub-window from the client device.

20 Claims, 9 Drawing Sheets

(56) References Cited

U.S. PATENT DOCUMENTS

| | | | | |
|---|---|---|---|---|
| 2014/0040763 | A1* | 2/2014 | Chakra | G06F 3/0482 |
| | | | | 715/748 |
| 2014/0223314 | A1* | 8/2014 | Pinto | G06F 1/1694 |
| | | | | 715/733 |
| 2015/0089381 | A1* | 3/2015 | Shao | G06F 3/013 |
| | | | | 715/740 |
| 2015/0271027 | A1* | 9/2015 | Goldberg | H04L 65/403 |
| | | | | 715/740 |
| 2016/0328107 | A1 | 11/2016 | Momchilov et al. | |
| 2017/0220311 | A1* | 8/2017 | Oh | G06F 3/04847 |
| 2018/0129510 | A1* | 5/2018 | Zhang | H04L 67/38 |

OTHER PUBLICATIONS

Soorajprasad et al., "VirtuMob: Remote Display Virtualization Solution for Smartphones," International Journal of Computer Trends and Technology (IJCTT), vol. 11, No. 4, May 2014, pp. 169-173.
Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

810 ClientInit (extended)

| | Description | Type [Value] |
|---|---|---|
| 811 | shared-flag | 0 |
| 812 | sub-window-flag | 1 |

| DESCRIPTION | C501 TYPE[VALUE] | C502 TYPE[VALUE] | C503 TYPE[VALUE] |
|---|---|---|---|
| framebuffer-height in pixels | 2014 | 300 | 724 |
| framebuffer-width in pixels | 100 | 668 | 668 |
| server-pixel-format | 32 | 32 | 32 |
| id | AUI1 | AUI2 | AUI3 |
| name | EclipseMenuToolbar | EclipseProjects | EclipseEditor |
| X-coordinate | 0 | 0 | 300 |
| Y-coordinate | 0 | 100 | 100 |

FIG. 8B

830 FramebufferUpdateRequest (extended)

| DESCRIPTION | TYPE[VALUE] |
|---|---|
| Message-type | 1 |
| incremental | 1 |
| X-coordinate | 300 |
| Y-coordinate | 100 |
| width | 724 |
| height | 668 |
| Framebuffer UID | AUI3 |

831 brackets rows 1–6
832 points to Framebuffer UID row

FIG. 8C

840    PointerEvent

| DESCRIPTION | TYPE[VALUE] |
|---|---|
| Message-type | 1 |
| Button-mask | 1 |
| x-coordinate | 100 |
| y-coordinate | 100 |

841 brackets x-coordinate and y-coordinate rows

FIG. 8D

ACCESSING WINDOW OF REMOTE DESKTOP APPLICATION

BACKGROUND

The present invention relates to remote desktop applications, and more specifically, to splitting a graphical user interface (GUI) window of an application running on a host device into sub-windows for separate display and manipulation on a smaller screen of a client device.

Remote desktop applications are widely used today to allow a user to access a remote computer via the user's local computer. With the increasing popularity of mobile devices, such as smart phones and tablets, more and more people would like to use mobile devices to access remote desktop applications. For example, people might want to remotely access an enterprise application running on a host device, such as a server, and be able to manipulate graphical user interfaces (GUIs) of the application such that it can be virtually carried out on the mobile devices. As GUI windows of such applications are typically designed to be displayed on a full screen of desktop computers, if such a window is displayed on the screen of a mobile device, which is much smaller in size than that of a desktop computer, it would be hard to view contents and difficult to manipulate controls in the window.

SUMMARY

According to one embodiment of the present invention, there is provided a computer-implement method. According to the method, a split view of a window on a host device is determined at the host device, wherein the split view comprises a plurality of sub-windows, and each of the sub-windows provides a view of a portion of the window to be shared to a client device. Information about the sub-windows is sent to the client device. Frame buffer data of at least one of the sub-windows is transmitted to the client device in response to in response to receiving a selection of the at least one sub-window from the client device.

According to another embodiment of the present invention, there is provided a computer-implemented system. The system comprises a computer processor coupled to a computer-readable memory unit. The memory unit comprises instructions that when executed by the computer processor implements a method. According to the method, a split view of a window on a host device is determined at the host device, wherein the split view comprises a plurality of sub-windows, and each of the sub-windows provides a view of a portion of the window to be shared to a client device. Information about the sub-windows is sent to the client device. Frame buffer data of at least one of the sub-windows is transmitted to the client device in response to receiving a selection of the at least one sub-window from the client device.

According to another embodiment of the present invention, there is provided a computer program product being tangibly stored on a non-transient machine-readable medium and comprising machine-executable instructions, the instructions, when executed on an electronic device, causing the electronic device to: determine, at a host device, a split view of a window on the host device, the split view comprising a plurality of sub-windows, and each of the sub-windows providing a view of a portion of the window to be shared to a client device; send information about the sub-windows to the client device; transmit frame buffer data of at least one of the sub-windows to the client device in response to receiving a selection of the at least one sub-window from the client device.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 5A and FIG. 5B depict a window of an application running on a desktop computer.

Throughout the drawings, same or similar reference numerals represent the same or similar elements.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
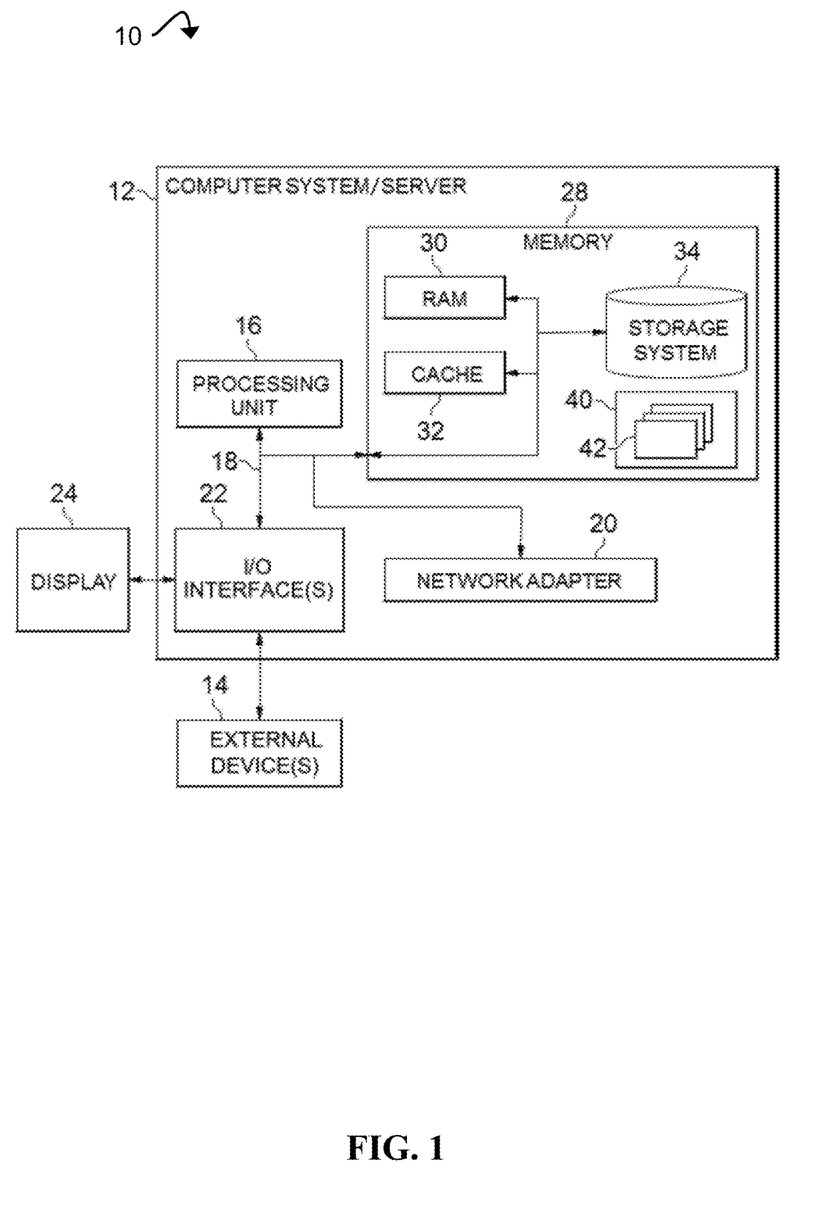
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
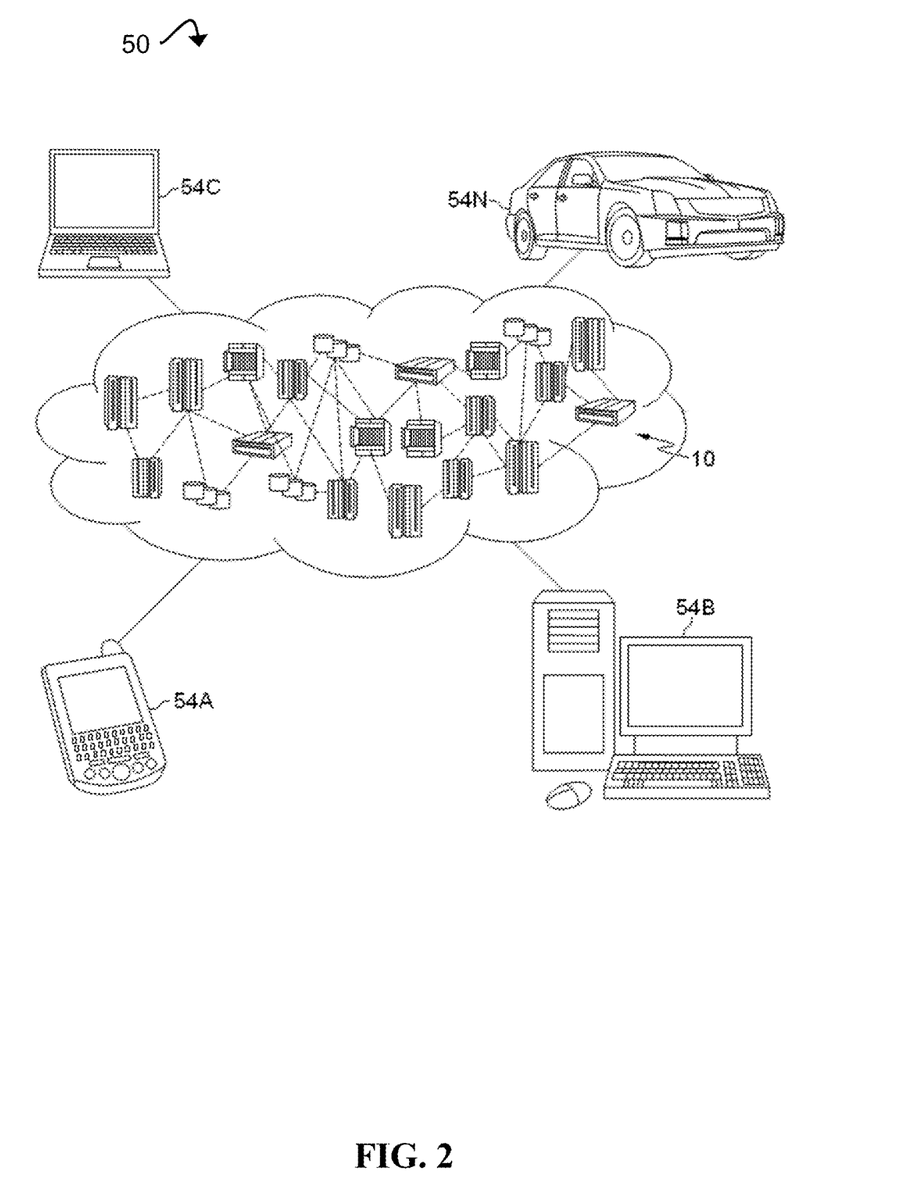
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
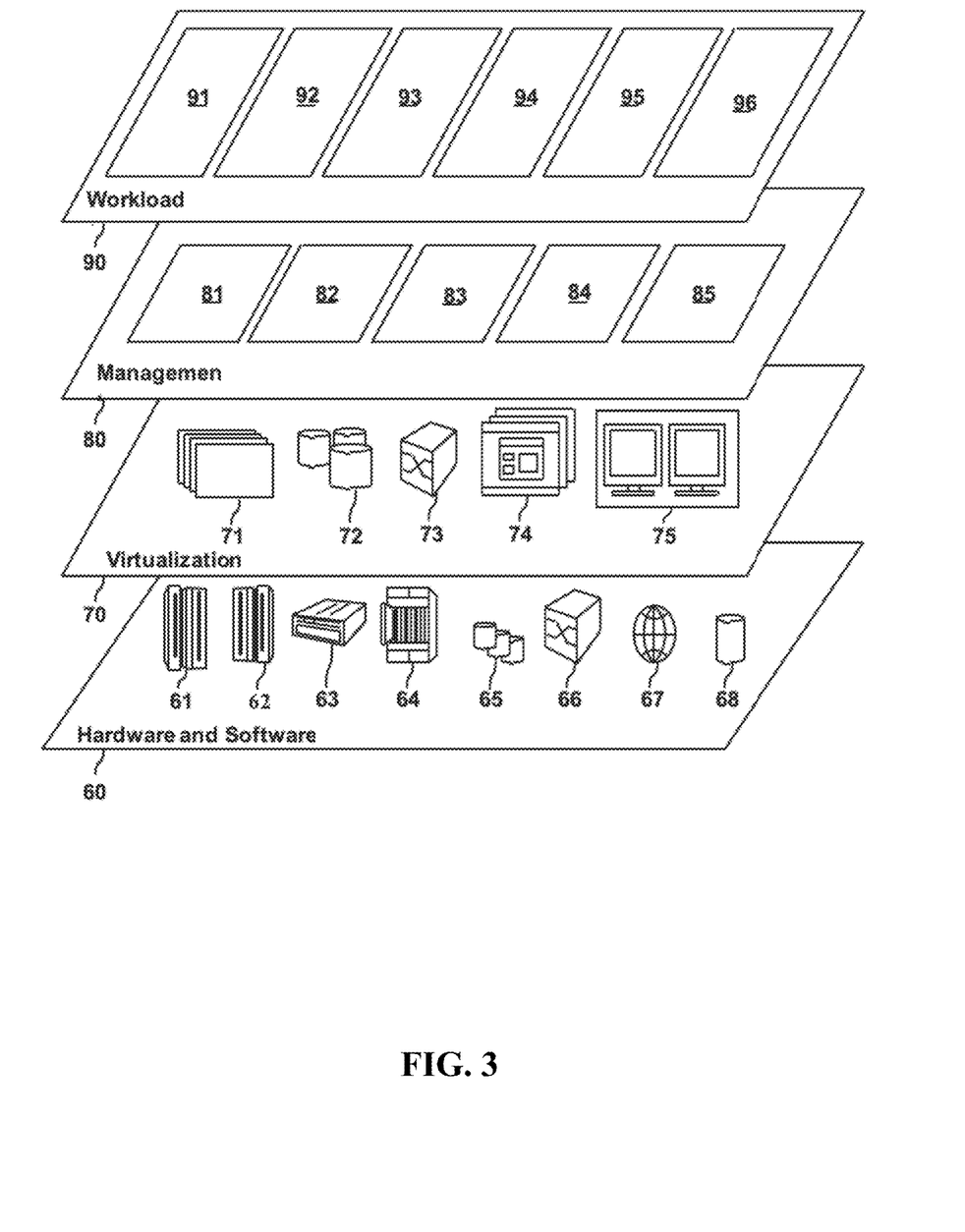
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service processing 96. Service processing 96 may implement a solution for remote desktop applications sharing services. The solution comprises determining, at a host device, a split view of a window of an application running on the host device, the split view comprising a plurality of sub-windows, and each of the sub-windows providing a view of a portion of the window. The solution further comprises sending information about the split view to a client device in communication with the host device. The solution further comprises sending remote frame buffer data of at least one of the sub-windows to the client device in response to receiving a request for displaying the at least one sub-window. The solution further comprises transforming an event data associated with the at least one sub-window to corresponding event data associated with the window in response to receiving the event data associated with the at least one sub-window from the client device.

With reference now to FIGS. 4 to 8D, exemplary embodiments of the present invention will be described. The exemplary embodiments are directed to a method, system and computer program product for splitting an original GUI window of an application running on a host device into several sub-windows for separate display and manipulation on a screen of a client device. The host device may be of any type of computing devices, such as desk computers, server computers, and the like. The client device may be any of different mobile devices, such as smart phones, PDAs (personal digital assistants), tablets, notebooks, and the like. In the context of the present invention, the size of display screen of the client device is smaller than that of the host device. For purpose of description, hereinafter, the client device is illustrated as a smartphone 54A of FIG. 2 and is also referred to as "client device 54A" or simply "client 54A". The host device is illustrated as a desktop computer 54B of FIG. 2 and is also referred to as "host device 54B" or simply "host 54B".

Figure 4:
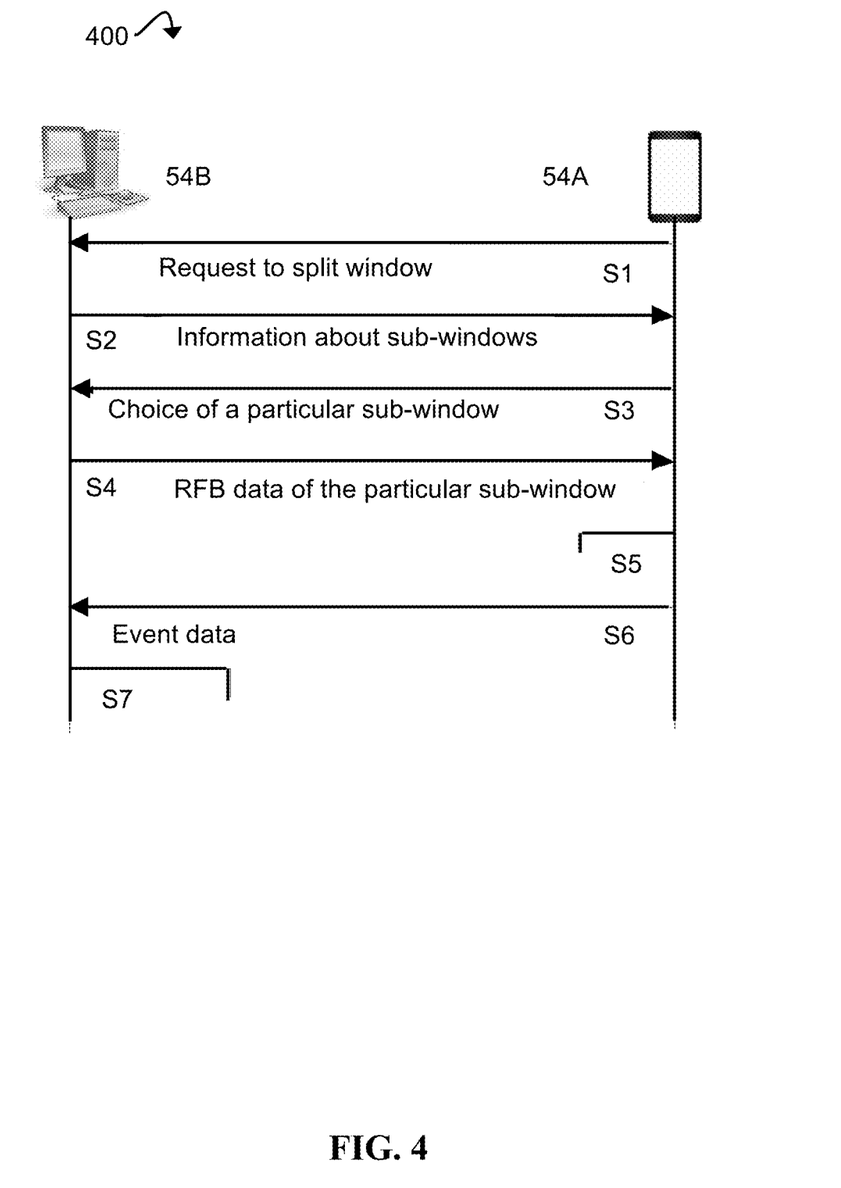
FIG. 4 depicts a general process of communications between a client device and a host device according to an embodiment of the invention.

Now refer to FIG. 4, which illustrates a general process 400 of communications between client device 54A and host device 54B according to an embodiment of the present invention.

Assume client device 54A is accessing an application (not shown) running on host device 54B. The functionality of the application may be visible to and accessible by client device 54A over cloud 50 via a remote desktop applications sharing system employing the remote frame buffer (RFB®) protocol. (RFB is a registered trademark of RealVNC Ltd.)

RFB is an open simple protocol for remote access to graphical user interfaces. Because it works at the frame buffer level, it is applicable to all windowing systems and applications, including Microsoft Windows, macOS. For example, the Windows® Remote Desktop Service is a window sharing system which uses the RDP protocol to allow for accessing applications and data on a remote computer over a network.

The desktop application sharing system in which client device 54A and host device 54B operate may be similar to such a windowing system, allowing a user (not shown) at client device 54A to remotely access an application running on host device 54B. The user's interaction with a GUI of the application may be captured at client device 54A and transmitted to host device 54B, relaying information that instructs further execution of the application, including updating a current GUI window.

The process 400 may be initiated virtually at any point of time while client device 54A is accessing the application running on host device 54B.

In step S1, client device 54A sends a request for switching window sharing mode from full-window mode to sub-window mode to host device 54B. This means that the user at the client device 54A expects host device 54B to split a full window into smaller sub-windows for displaying in the screen of client device 54A. The generation and transmission of the request may be triggered by an action of the user, for example a finger-press on a button provided in a screen of client device 54A.

In step S2, host 54B receives the request. In response, it splits an active window of the application running on it into sub-windows, and sends information about the sub-windows to client 54A.

Figure 5A:
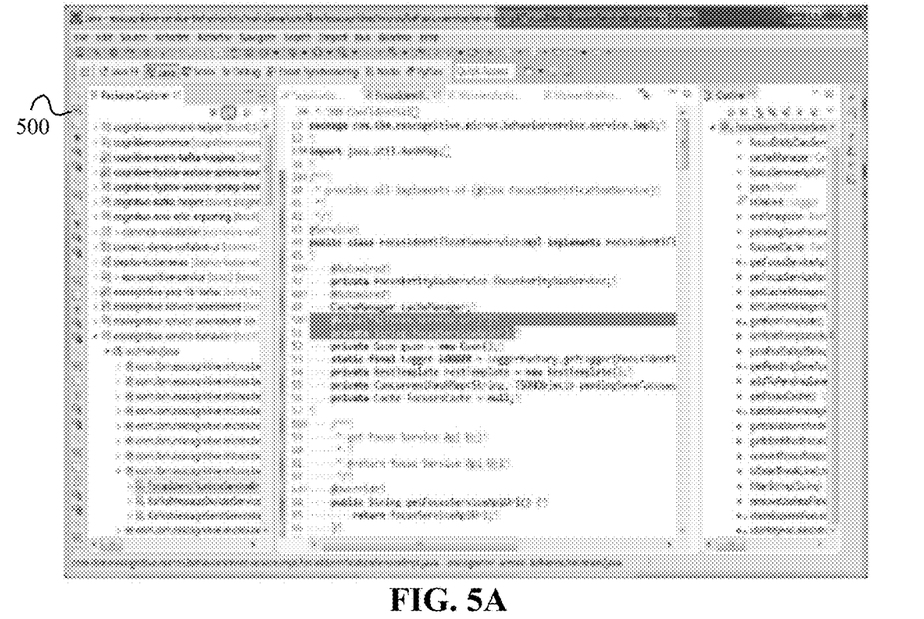
Figure 5B:
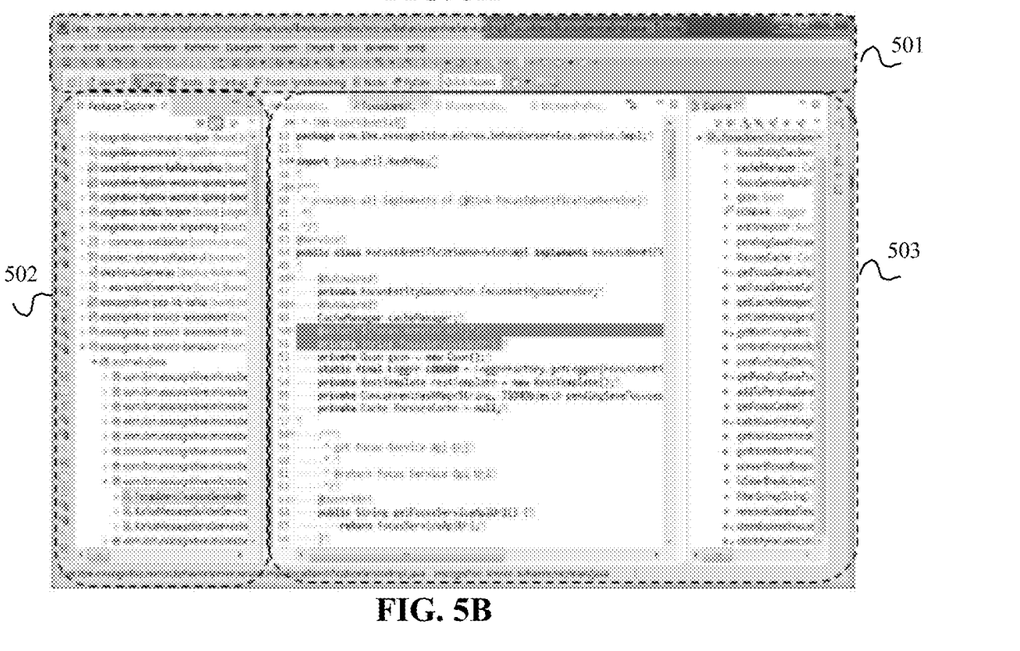
FIG. 5B depicts a split view comprising a plurality sub-windows of the window of FIG. 5A.

FIGS. 5A and FIG. 5B show an example of a window and an example of a split view of the window, respectively. Specifically, FIG. 5A illustrates a window 500, which is depicted as a GUI to be displayed as a result of the execution of the application running on host 54B. As shall be appreciated by those skilled in the art, such a window is normally designed to be displayed on a full screen of a desktop computer and might not be suitable for display on client 45A. Window 500 may contain viewable and/or editable contents. Window 500 may also contain operable components such as button, menu item, icon and the like. Because the contents and components displayed in the example window 500 are irrelevant to the invention, they are not clearly shown in FIG. 5A. This is to simplify the illustration without obscuring the points of the invention.

FIG. 5B depicts a split view of window 500 determined by step S2. The split view consists of multiple sub-windows 501, 502 and 503. Each sub-window is an independent functional area. In fact, in the present example as shown, sub-window 501 represents a file folder area, sub-window 502 represents a menu toolbar area, and sub-window 503 represents an edit area in which a user may view and edit textual content.

Referring again to FIG. 4, host 54B collects information about each sub-window and sends the information to client 54A. For a particular one of the sub-windows (e.g., sub-windows 501, 502, or 503), the information may include an identifier, a name and a pixel based size of the particular sub-window as well as its location within window 500. The information is sent to client 54A.

Figure 6A:
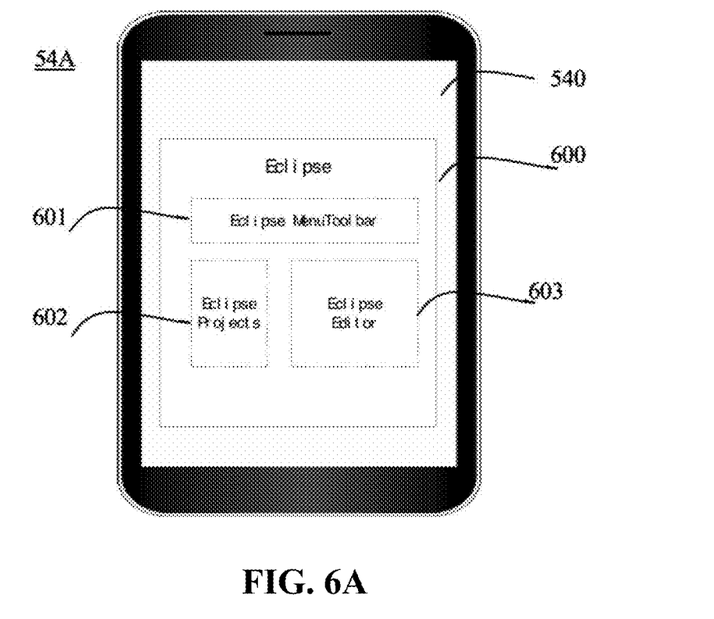
FIG. 6A depicts a render list displayed in a screen of the client device according to an embodiment of the invention.

In step S3, client 54A receives the information. Based on the information, client 54A creates a render list and shows it for the user's awareness. FIG. 6A depicts a sample render list 600 shown in the screen 540 of client 54A. As shown, render list 600 includes three render items 601, 602 and 603. The render items illustrated in FIG. 6A correspond to sub-windows illustrated in FIG. 5B. Render item 601 shows "Eclipse MenuToolbar", which is the name of sub-window 501. Similarly, render item 602 shows "Eclipse Projects", the name of sub-window 502, and render item 603 shows "Eclipse Editor", the name of sub-window 503.

From the self-descriptive render list 600, the user is notified of three sub-windows 501, 502 and 503 available for display on screen 540. The user then makes a choice among render items 601, 602 and 603. This choice is sent to host 54B. For example, assuming the choice is render item 603 representing sub-window 503, the choice is sent to host 54B as a request for host 54B to transmit remote frame buffer (RFB) data associated with sub-window 503.

In step S4, host 54B receives the choice of sub-window 503. In response, host 54B sends remote frame RFB data associated with sub-window 503 to client 54A.

Figure 6B:
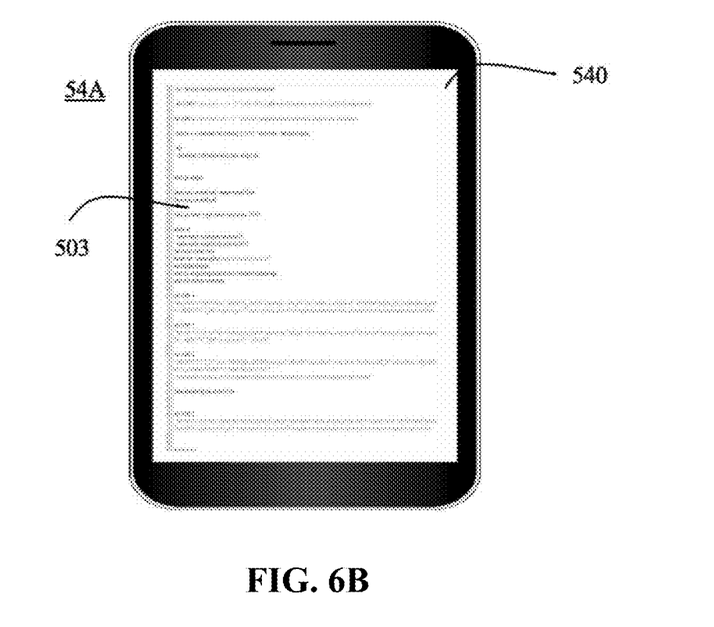
FIG. 6B depicts one of the sub-windows as it is being displayed in a screen of client device according to an embodiment of the invention.

In step S5, client 54A receives the RFB data. Based on the RFB data, client 54A displays sub-window 503 on its screen 540. An example of this display is shown in FIG. 6B.

In step S6, the user may interact with sub-window 503 the same way as if interacting with full window 500. Client 54A will capture the user's operation on any object in sub-window 503. An event data may be generated as a result, and the event data is sent to host 54B.

In step S7, host 54B receives the event data. Host 54B transforms the event data associated with sub-window 503 to corresponding event data associated with full window 500. The execution of the application will continue according to the transformed event data.

Process 400 is a general process of communications between client device 54A and host device 54B according to an embodiment of the present invention. A more detailed description of operations at the side of host 54B, as well as the side of client 54A, is provided below.

Figure 7:
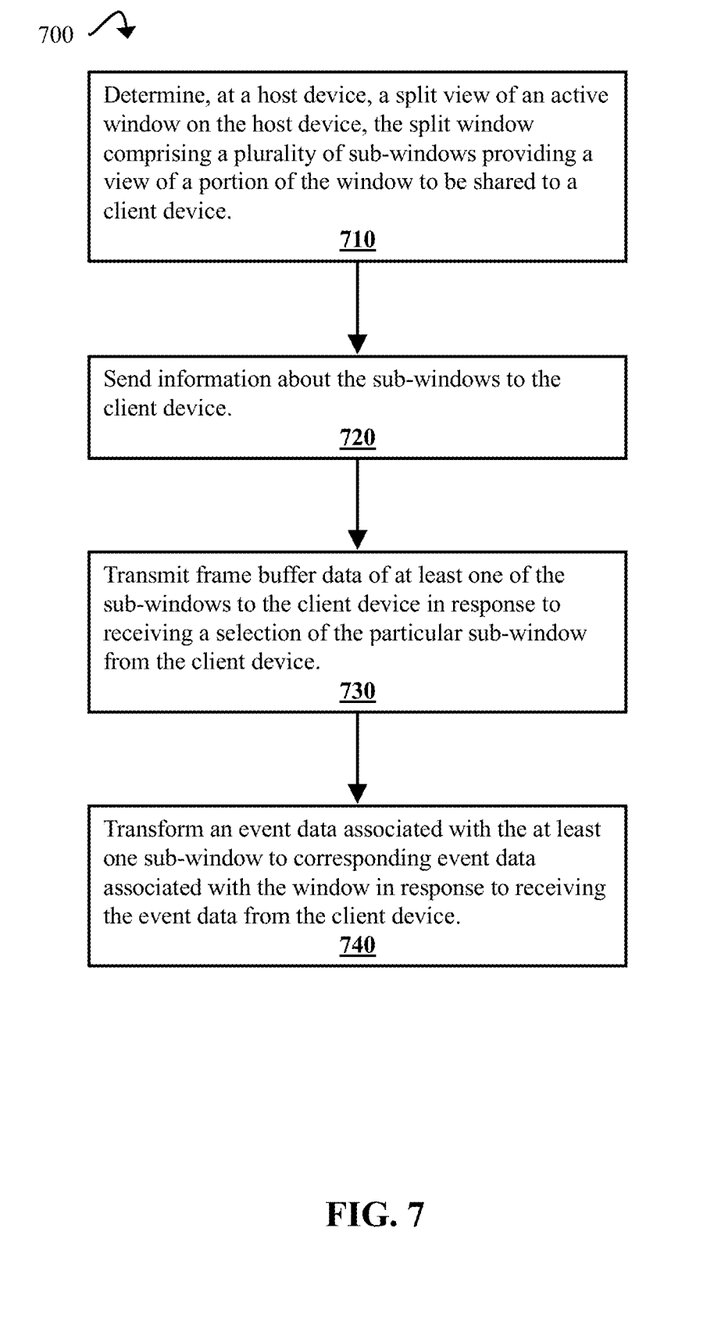
FIG. 7 depicts a flowchart of main process of a method performed at the host device according to an embodiment of the invention.

Refer to FIG. 7, which is a flowchart illustrating a main process of a method 700 performed at the host device according to an embodiment of the invention. The main process comprises steps 710, 720, and 730. The process also comprises step 740 in some embodiments.

The first step is step 710, in which the host device 54B determines a split view of a window of an application running on the host device 54B, the split view comprising a plurality of sub-windows 501, 502, and 503, and each of the sub-windows providing a view of a portion of the window 500.

Step 710 corresponds to step S2 of FIG. 4. According to an embodiment of the invention, step 710 may be executed in response to receiving a request from client 54A for switching to sub-window mode.

According to an embodiment of the invention, the request may be sent by client 54A along with an RFB protocol compliant ClientInit message as part of initialization for communication with host 54B. In practical implementation, the ClientInit message may be extended by including an additional data field to indicate such a request. This is illustrated by data structure 810 in FIG. 8A. Data structure 810 includes two fields 811 and 812. A standard ClientInit message merely includes field 811. Therefore, data structure 810 represents an extension of the ClientInit message that may be generated by including an additional field "sub-window flag" 812. Here, the value "1" of field 812 indicates that client 54A requests to switch to sub-window mode.

It is to be noted that, in the above description, step 710 is executed in response to the request from client 54A. However, it is not necessary for step 710 to be executed only at the request of client 54A. As will be appreciated by those skilled in the art, according to an embodiment of the invention, host 54B may be configured to start executing step 710 in absence of the request from client 54A.

According to an embodiment of the invention, in determining a split view of window 500 in step 710, window handles for sub-windows 501, 502, 503 may be identified at first. This may be done by leveraging, or in the same way as, existing UI-splitting components already developed in prior art windowing systems. For example, WinAPI is one of OS level APIs capable of identifying window handles. Thus, host 54B may invoke such a component to identify window handles for all sub-windows of window 500, including sub-windows 501, 502 and 503.

As a result of determining the split view of window 500, frame buffer data associated with sub-windows 501, 502 and 503 may be decided. In addition, information about frame buffers associated with sub-windows 501, 502, 503 may be obtained. According to an embodiment of the invention, the information may be derived from metadata of the window handles associated with sub-windows 501, 502, 503.

To be concise, wherever the context is clear, the phrase "information about frame buffers associated with sub-windows" is also termed as "information about the sub-windows" or simply as "information about the split view" in the present disclosure. In addition, the terms "remote frame buffer", "frame buffer", and "sub-window" are interchangeable where the context is clear to those skilled in the art.

The information about the split view obtained from the meta data may include the following items for each of the frame buffers:

Identifier of the frame buffer;
Name of the frame buffer, which is more descriptive than the identifier for the user to understand the function of the associated sub-window;
Size of the frame buffer, defined by height and width in pixel;
Location for the frame buffer: defined by X-coordinate and Y-coordinate of top-left corner of the frame buffer.

Figure 8A:
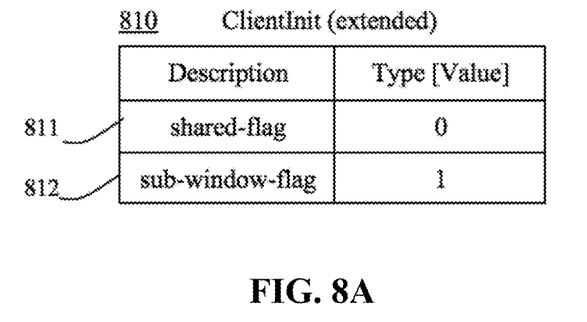
FIG. 8A to FIG. 8D illustrate exemplary data used in communications between the client device and the host device according to embodiments of the invention.
Figure 8B:
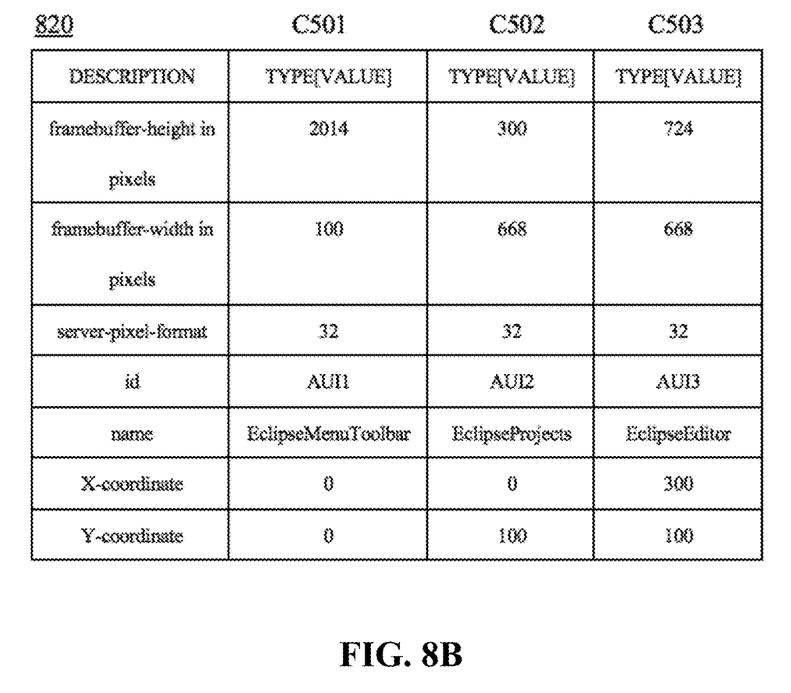

Refer to FIG. 8B, which depicts an example table 820 containing the following parameters included in the information about the frame buffers:

"Framebuffer-height in pixels", the pixel based height of a frame buffer;
"Framebuffer-width in pixels", the pixel based width of the frame buffer;
"Server-pixel-format", the pixel format of server;
"Id", the identifier of the frame buffer;
"Name", the title of the sub-window associated with the frame buffer;
"X-coordinate": horizontal coordinate of the top-left corner of the frame buffer;
"Y-coordinate": vertical coordinate of the top-left corner of the frame buffer.

In table 820, it is shown three value columns C501, C502 and C503 respectively corresponding to sub-windows 501, 502 and 503. For example, column C503 corresponds to sub-window 503. As shown, the name of the frame buffer associated with sub-window 503 is "EclipseEditor". The identifier is "AUI3". The framebuffer is of pixel format. The size is 724 by 668 in pixel and its location is defined by coordinate <300,100>.

Referring again to FIG. 7, the process proceeds to step 720. In step 720, host device 54B sends the information about the sub-windows to client device 54A.

In connection with step 720, reference may be made to previous description of step S3 in FIG. 4. In step S3, client 54A receives the information sent by host 54B. Based on the information, client 54A creates render items 601, 602 and 603 and displays them on screen 540 for the user to selection a sub-window. Assuming the user selects sub-window 503, client 54A will send the selection to host 54B.

Figure 8C:
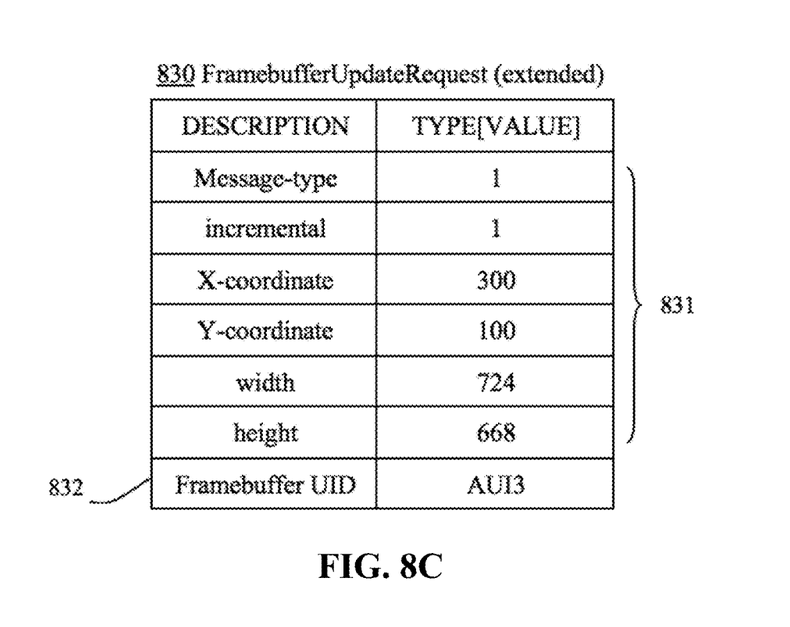

According to an embodiment of the invention, the selection may be transmitted to host 54B along with a standard FramebufferUpdateRequest message. Refer to FIG. 8C, which depicts a message 830 sent to host 54B for the selection. Message 830 consists of a group of parameters 831 and a parameter "Framebuffer UID". Since a FramebufferUpdateRequest message only includes the group of parameters 831, message 830 may regarded as an extension of the FramebufferUpdateRequest message by appending an additional field 832 for the parameter "Framebuffer UID". Therefore, as an alternative, the selection may be transmitted using such an extended FramebufferUpdateRequest message.

The identifier "AUI3" in message 830 indicates that sub-window 503 is selected for displaying in client 54A. Such a selection of a particular sub-window may be sent as a request in the form of message 830 to host device, which will trigger the execution of step 730.

In step 730, the host device 54B transmits frame buffer data of at least one of the sub-windows to the client device in response to receiving a selection of the at least one sub-window from the client device. In the case of the present example, host 54B receives a request for displaying a particular sub-windows 503. Therefore, it transmits the RFB data associated with the particular sub-window 503 to client 54A.

As previously mentioned with reference to FIG. 4, upon receiving the RFB data, client 54A displays the image of sub-window 503 on its screen 540 (S5) with the RFB data. Now the user may manipulate sub-window 503 and view its content. For example, the user may scroll up/down or zoom in/out sub-window 503 with control tools, such as scroll-bar, provided in screen 540.

The user may also interact with an object in sub-window 503. Examples of the type of the object include a button, a menu item, an icon, and the like. For example, the user may press a function button. The operation will be captured by client 54A. Client 54A will generate an event data and transmitted it to host 54B to cause corresponding execution of the application running on host 54B.

Figure 8D:
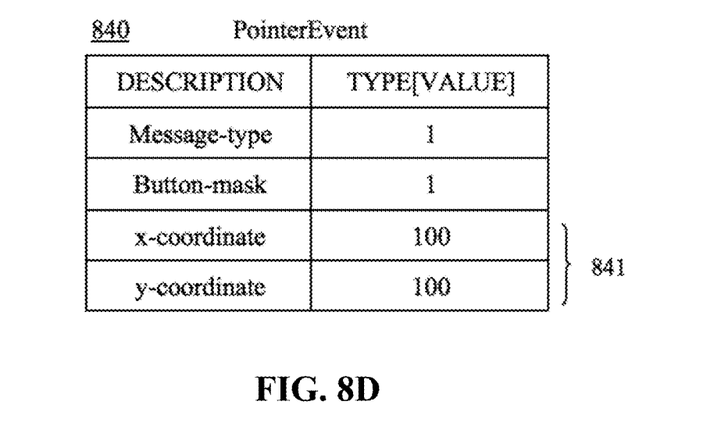

FIG. 8D depicts an example of such an event data. Specifically, it is a PointerEvent message 840 according to the PDF protocol, which indicates either pointer movement or a pointer button press or release. Message 840 includes the parameter <x-coordinate, y-coordinate> to indicate the position of the pointer, which is also the position of an object the user is operating on. In the example as shown, the position is <100,100> 841 in sub-window 503. When client 54A may send message 840 to host 54B.

According to an embodiment of the invention, when host 54B receives an event data like message 840, an additional step 740 of method 700 is triggered.

In step 740, the host device transforms an event data associated with the at least one sub-window to corresponding event data associated with the window in response to receiving the event data from the client device.

In the present example, host 54B knows the particular sub-window 503 is being displayed in screen 540 of client 54A and the location for sub-window 503 in window 500 is defined by coordinate <300,100> of the top-left of sub-window 503 (see FIG. 8C). In the example, the position of the object in sub-window 503 is <100,100> (see FIG. 8D, 841). The object's position in sub-window 503 may be mapped to its corresponding position in window 500, which is <300+100, 100+100>, namely <400,200>. In this way, the original event data (1,1,100,100) on the basis of sub-window 503, as shown in message 840, may be transformed to corresponding event data (1,1,400,200) on the basis of window 500. The transformed event data may cause corresponding execution of the application running on host 54B.

Description of embodiments of the invention is provided in the above. It is noted that the description in the above in connection with only one particular sub-window 503. However, those skilled in the art shall appreciate that the embodiments may readily be extended for more than one window within the spirit of the invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    determining, at a host device, positions of sub-windows of a full window of an application running on the host device and physically displayed at the host device in a first user interface, wherein each of the sub-windows is an independent functional area of the full window displayed in the first user interface;
    sending information about the sub-windows to a client device that is remotely accessing the application running on the host device, wherein the information comprises the positions of the sub-windows in the full window;
    generating, at the client device, a list of text identifiers describing the sub-windows displayed in the first user interface;
    displaying, at the client device in a second user interface, the list of text identifiers;
    receiving, at the client device, a user-input choice of a text identifier from the list of text identifiers, wherein the text identifier corresponds to a selected sub-window from the full window;
    sending the user-input choice to the host device as a request for the host device to transmit remote frame buffer data of the selected sub-window;
    transmitting, by the host device, the frame buffer data of the selected sub-window to the client device in response to receiving the request; and
    in response to receiving the frame buffer data, displaying the selected sub-window in the second user interface at the client device while simultaneously displaying the full window in the first user interface at the host device.

2. The method according to claim 1, further comprising:
    transforming an event data associated with the selected sub-window to corresponding event data associated with the full window in response to receiving the event data from the client device.

3. The method according to claim 1, further comprising identifying window handles for the sub-windows.

4. The method according to claim 3, wherein the information about the sub-windows is obtained from metadata of the window handles.

5. The method according to claim 2, wherein the event data associated with the selected sub-window comprises a position of an object in the selected sub-window.

6. The method according to claim 5, wherein the transforming the event data associated with the selected sub-window to the corresponding event data associated with the full window comprises: mapping the position of the object in the selected sub-window to a position in the full window based on a position of the selected sub-window within the full window.

7. The method according to claim 1, wherein the determining the positions of the sub-windows in the full window is responsive to a request for switching window sharing mode from full-window mode to sub-window mode from the client device.

8. A computer-implemented system, comprising a computer processor coupled to a computer-readable memory unit, the memory unit comprising instructions that when executed by the computer processor implements a method comprising:
    determining, at a host device, positions of sub-windows of a full window of an application running on the host device and physically displayed at the host device in a first user interface, wherein each of the sub-windows is an independent functional area of the full window displayed in the first user interface;
    sending information about the sub-windows to a client device that is remotely accessing the application running on the host device, wherein the information comprises the positions of the sub-windows in the full window;
    generating, at the client device, a list of text identifiers describing the sub-windows displayed in the first user interface;
    displaying, at the client device in a second user interface, the list of text identifiers;

receiving, at the client device, a user-input choice of a text identifier from the list of text identifiers, wherein the text identifier corresponds to a selected sub-window from the full window;

sending the user-input choice to the host device as a request for the host device to transmit remote frame buffer data of the selected sub-window;

transmitting, by the host device, the frame buffer data of the selected sub-window to the client device in response to receiving the request; and in response to receiving the frame buffer data, displaying the selected sub-window in the second user interface at the client device while simultaneously displaying the full window in the first user interface at the host device.

9. The system according to claim 8, the method further comprising:

transforming an event data associated with the selected sub-window to corresponding event data associated with the full window in response to receiving the event data from the client device.

10. The system according to claim 8, further comprising identifying window handles for the sub-windows.

11. The system according to claim 10, wherein the information about the sub-windows is obtained from metadata of the window handles.

12. The system according to claim 9, wherein the event data associated with the selected sub-window comprises a position of an object in the selected sub-window.

13. The system according to claim 12, wherein the transforming the event data associated with the selected sub-window to corresponding event data associated with the full window comprises: mapping the position of the object in the selected sub-window to a position in the full window based on a position of the selected sub-window within the full window.

14. The system according to claim 8, wherein the determining the positions of the sub-windows in the full window is responsive to receiving a request for switching window sharing mode from full-window mode to sub-window mode from the client device.

15. A computer program product comprising a non-transient machine-readable medium having machine-executable instructions embodied therewith, the instructions, when executed on an electronic device, causing the electronic device to:

determine, at a host device, positions of sub-windows of a full window of an application running on the host device and physically displayed at the host device in a first user interface, wherein each of the sub-windows is an independent functional area of the full window displayed in the first user interface;

send information about the sub-windows to a client device, wherein the client device that is remotely accessing the application running on the host device, wherein the information comprises the positions of the sub-windows in the full window;

generate, at the client device, a list of text identifiers describing the sub-windows displayed in the first user interface;

display, at the client device in a second user interface, the list of text identifiers;

receive, at the client device, a user-input choice of a text identifier from the list of text identifiers, wherein the text identifier corresponds to a selected sub-window from the full window;

send the user-input choice to the host device as a request for the host device to transmit remote frame buffer data of the selected sub-window;

transmit, by the host device, the frame buffer data of the selected sub-window to the client device in response to receiving the request;

in response to receiving the frame buffer data, display the selected sub-window in the second user interface at the client device while simultaneously displaying the full window in the first user interface at the host device;

generate, at the client device, an event data associated with the selected sub-window, the event data comprising a position of an object in the selected sub-window at the client device;

receive, at the host device, the event data from the client device; and transform, at the host device, the event data from the client device to a corresponding event data associated with the full window, wherein the transforming comprises:

mapping the position of the object in the sub-window at the client device to a position of a corresponding object in the full window based on a position of the selected sub-window in the full window.

16. The computer program product according to claim 15, wherein the instructions further cause the electronic device to identify window handles for the sub-windows.

17. The computer program product according to claim 16, wherein the information about the sub-windows is obtained from metadata of the window handles.

18. The computer program product according to claim 15, wherein the information further comprises pixel-based sizes of the sub-windows.

19. The computer program product according to claim 15, further comprising executing the application according to the transformed event data.

20. The computer program product according to claim 15, wherein the application is accessible to the client device via a remote desktop application sharing system.

* * * * *